(12) United States Patent
Romelhardt et al.

(10) Patent No.: US 10,940,736 B2
(45) Date of Patent: Mar. 9, 2021

(54) VARIABLE STIFFNESS SWAY BAR FOR A SUSPENSION SYSTEM OF A MOTOR VEHICLE

(71) Applicant: GM Global Technology Operations LLC, Detroit, MI (US)

(72) Inventors: Timothy J. Romelhardt, Fenton, MI (US); Xinyu Du, Oakland Township, MI (US)

(73) Assignee: GM GLOBAL TECHNOLOGY LLC, Detroit, MI (US)

( * ) Notice: Subject to any disclaimer, the term of this patent is extended or adjusted under 35 U.S.C. 154(b) by 86 days.

(21) Appl. No.: 16/428,117

(22) Filed: May 31, 2019

(65) Prior Publication Data
US 2020/0376918 A1    Dec. 3, 2020

(51) Int. Cl.
| | | |
|---|---|---|
| *B60G 21/055* | (2006.01) | |
| *B60G 17/016* | (2006.01) | |
| *B60W 30/045* | (2012.01) | |
| *B60G 17/0195* | (2006.01) | |
| *B60W 10/22* | (2006.01) | |
| *B60G 17/018* | (2006.01) | |

(52) U.S. Cl.
CPC ..... *B60G 21/0558* (2013.01); *B60G 21/0555* (2013.01); *B60G 17/0162* (2013.01); *B60G 17/0182* (2013.01); *B60G 17/0195* (2013.01); *B60G 2202/135* (2013.01); *B60W 10/22* (2013.01); *B60W 30/045* (2013.01)

(58) Field of Classification Search
CPC ............ B60G 21/0558; B60G 21/0555; B60G 21/00; B60G 21/0553; B60G 2202/135; B60G 17/0162; B60G 17/0182; B60G 17/0195

USPC ........................................................ 280/5.511
See application file for complete search history.

(56) References Cited

U.S. PATENT DOCUMENTS

| | | | | |
|---|---|---|---|---|
| 4,714,272 | A  * | 12/1987 | Buma ................ | B60G 17/0165 280/5.516 |
| 6,543,595 | B2 * | 4/2003  | Okuma ................... | F16D 27/14 192/21.5 |
| 6,668,996 | B2 * | 12/2003 | Nekado ................. | F16D 27/115 192/30 W |
| 6,832,772 | B2   | 12/2004 | Conover | |

(Continued)

FOREIGN PATENT DOCUMENTS

DE        102012010119 A1     6/2013

*Primary Examiner* — Paul N Dickson
*Assistant Examiner* — Daniel M. Keck
(74) *Attorney, Agent, or Firm* — Vivacqua Crane

(57) ABSTRACT

The present disclosure provides a sway bar for a suspension system of a motor vehicle. The sway bar includes a first lever arm for attachment to a left wheel suspension component and a second lever arm for attachment to a right wheel suspension component. The sway bar further includes a torsion spring device in connection between the first lever arm and the second lever arm to provide variable torsional stiffness. The torsion spring device includes a first torsion bar, a second torsion bar, and a clutch connected to the first torsion bar and the second torsion bar. The clutch is configured to move between a disengaged position and an engaged position where both of the first and second torsion bars transmit torque between the first and second lever arms to provide torsional stiffness.

16 Claims, 5 Drawing Sheets

(56) References Cited

U.S. PATENT DOCUMENTS

| | | | |
|---|---|---|---|
| 7,725,226 B2* | 5/2010 | Urababa | B60G 17/0162 |
| | | | 701/38 |
| 8,050,818 B2 | 11/2011 | Mizuta | |
| 2005/0203684 A1* | 9/2005 | Borgesson | B60K 37/02 |
| | | | 701/36 |
| 2009/0085310 A1* | 4/2009 | Dziemballa | B60G 21/055 |
| | | | 280/5.511 |
| 2020/0361272 A1* | 11/2020 | Jackson | B60G 21/106 |

* cited by examiner

VARIABLE STIFFNESS SWAY BAR FOR A SUSPENSION SYSTEM OF A MOTOR VEHICLE

INTRODUCTION

The present disclosure relates to a sway bar for a suspension system, and more particularly to a sway bar providing variable roll stiffnesses for a suspension system used in a motor vehicle.

Suspension systems include many features that raise or lower each side of the vehicle to similar vertical heights to reduce body lean and improve handling on curves, sharp corners, or bumps in the road. One example of these features includes a sway bar that pivotally connects the left and right sides of the suspension system to mounts on the body. If the left and right sides of the suspension system raise or lower by the same vertical height relative to the body, the sway bar pivots about its mounts without any twisting. However, if one side of the suspension system raises or lowers relative to the other side, the sway bar twists under a torsional load. The sway bar resists twisting and torsional loads through its stiffness. The stiffness of the sway bar depends upon on the modulus of rigidity of material forming the sway bar and its shape relative to the locations of its mounts on the body and suspension components.

One example of the sway bar includes a single cylindrical steel bar extending between left and right sides of a suspension system for providing one fixed roll stiffness. The sway bar can be installed on the rear of the vehicle to provide a roll stiffness at the rear of the vehicle that is proportionally larger than a roll stiffness at the front of the vehicle, so as to reduce understeer of the vehicle. In another example, the sway bar can be installed on the front of the vehicle to provide a roll stiffness at the front of the vehicle that is proportionally larger than a roll stiffness at the rear of the vehicle, so as to reduce oversteer of the vehicle.

While some sway bars are in the form of cylindrical steel bars that provide one fixed roll stiffness for a suspension system, other sway bar mechanisms have adjustable lever arms that can be manually adjusted to provide multiple roll stiffnesses. Still other suspension systems can include complex sway bars and drive systems with multiple motors that are expensive and slow to adjust the roll stiffness of the vehicle.

Thus, while current sway bar mechanisms achieve their intended purposes, there is a need for a new and improved sway bar that addresses these issues.

SUMMARY

According to several aspects, a sway bar for a suspension system of a motor vehicle is provided. The suspension system includes left and right wheel suspension components. The sway bar includes a first lever arm for attachment to the left wheel suspension component and a second lever arm for attachment to the right wheel suspension component. The sway bar further includes a torsion spring device in connection between the first lever arm and the second lever arm to provide variable torsional stiffness. The torsion spring device includes a first torsion bar, a second torsion bar, and a clutch connected to the first torsion bar and the second torsion bar. The clutch is configured to move between a disengaged position and an engaged position where both of the first and second torsion bars transmit torque between the first and second lever arms to provide torsional stiffness.

In one aspect, neither one of the first and second torsion bars transmit torque between the first and second lever arms in response to the clutch being disposed in the disengaged position.

In another aspect, the first torsion bar, the clutch, and the second torsion bar are disposed in a serial arrangement, respectively, along a common axis that extends between the first and second lever arms. The first torsion bar is connected to the first lever arm, the second torsion bar is connected to the second lever arm, and the clutch is disposed between the first and second torsion bars to transmit torque between the first and second lever arms in response to the clutch being engaged.

In another aspect, the first and second torsion bars have a common outer diameter such that the first and second torsion bars have a common torsional stiffness.

In another aspect, the clutch is normally disposed in the disengaged position.

In another aspect, the clutch includes an electromagnetic clutch, which includes a plurality of outer discs connected to one of the first and second torsion bars. The electromagnetic clutch further includes a plurality of inner discs connected to the other of the first torsion bar and the second torsion bar. In addition, the electromagnetic clutch also includes a coil configured to generate a magnetic flux for pressing the outer discs and the inner discs against one another in response to the clutch being disposed in the engaged position.

In another aspect, the first torsion bar transmits torque between the first and second lever arms in response to the clutch being disposed in the disengaged position.

In another aspect, the first lever arm, the first torsion bar, and the second lever arm are integral portions of a solid bar having one end attached to the left wheel suspension component and the other end attached to the right wheel suspension component.

In another aspect, the second torsion bar is coextensive with a portion of the first torsion bar along a common axis that extends between the first and second lever arms.

In another aspect, the second torsion bar comprises a tube defining a bore with at least a portion of the first torsion bar being disposed within the bore.

In another aspect, the tube has a continuous wall thickness without any holes formed therethrough.

In another aspect, the tube includes one end welded to the first torsion bar and another end coupled to the clutch.

According to several aspects, a suspension system for a motor vehicle includes a left wheel suspension component, a right wheel suspension component, and a sway bar having a first lever arm coupled to the left wheel suspension component and a second lever arm coupled to the right wheel suspension component. The sway bar further includes a torsion spring device in connection between the first lever arm and the second lever arm to provide variable torsional stiffness. The torsion spring device includes a first torsion bar, a second torsion bar, and a clutch connected to the first torsion bar and the second torsion bar. The clutch is configured to move between a disengaged position and an engaged position where both of the first and second torsion bars transmit torque between the first and second lever arms to provide torsional stiffness. The suspension system further includes a controller configured to send a first actuation signal to the clutch for moving the clutch to the engaged position.

In another aspect, the clutch is normally disposed in the disengaged position.

In one aspect, the clutch comprises an electromagnetic clutch, and the controller is configured to modulate a current supplied to the clutch for moving the clutch to the engaged position to provide a plurality of torsional stiffnesses.

In another aspect, the suspension system further includes an accelerometer configured to measure acceleration of the motor vehicle, and the controller is configured to send the first actuation signal to the clutch in response to the controller determining that the measured acceleration is above a predetermined acceleration threshold.

In another aspect, the suspension system further includes a vehicle speed sensor configured to measure a speed of the motor vehicle and a steering sensor configured to measure a steering angle of the motor vehicle. The controller is configured to send the first actuation signal to the clutch in response to the controller determining that the steering angle is above a predetermined steering threshold associated with the speed of the motor vehicle.

In another aspect, the suspension system further includes a ride height sensor configured to measure a rate of vertical movement of at least one of the left and right wheel suspension components. The controller is configured to send a second actuation signal to the clutch to move the clutch from the disengaged position to the engaged position, in response to the controller determining that the rate of vertical movement is above a predetermined rate threshold.

In another aspect, the suspension system further includes a brake sensor configured to measure brake application. The controller is configured to send the first actuation signal to the clutch in response to the controller determining that the brake pedal application is above a predetermined brake threshold.

According to several aspects, a suspension system for a motor vehicle includes a left wheel suspension component, a right wheel suspension component, and a sway bar having a first lever arm coupled to the left wheel suspension component and a second lever arm coupled to the right wheel suspension component. The sway bar further includes a torsion spring device in connection between the first lever arm and the second lever arm to provide variable torsional stiffness. The torsion spring device includes a first torsion bar, a second torsion bar, and a clutch connected to the first torsion bar and the second torsion bar. The clutch is configured to move between a disengaged position and an engaged position where both of the first and second torsion bars transmit torque between the first and second lever arms to provide torsional stiffness. The suspension system further includes a controller configured to send a first actuation signal to the clutch for moving the clutch to the engaged position. The suspension system further includes a user interface coupled to the controller and configured to send a first command signal to the controller such that the controller sends the first actuation signal to the clutch.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
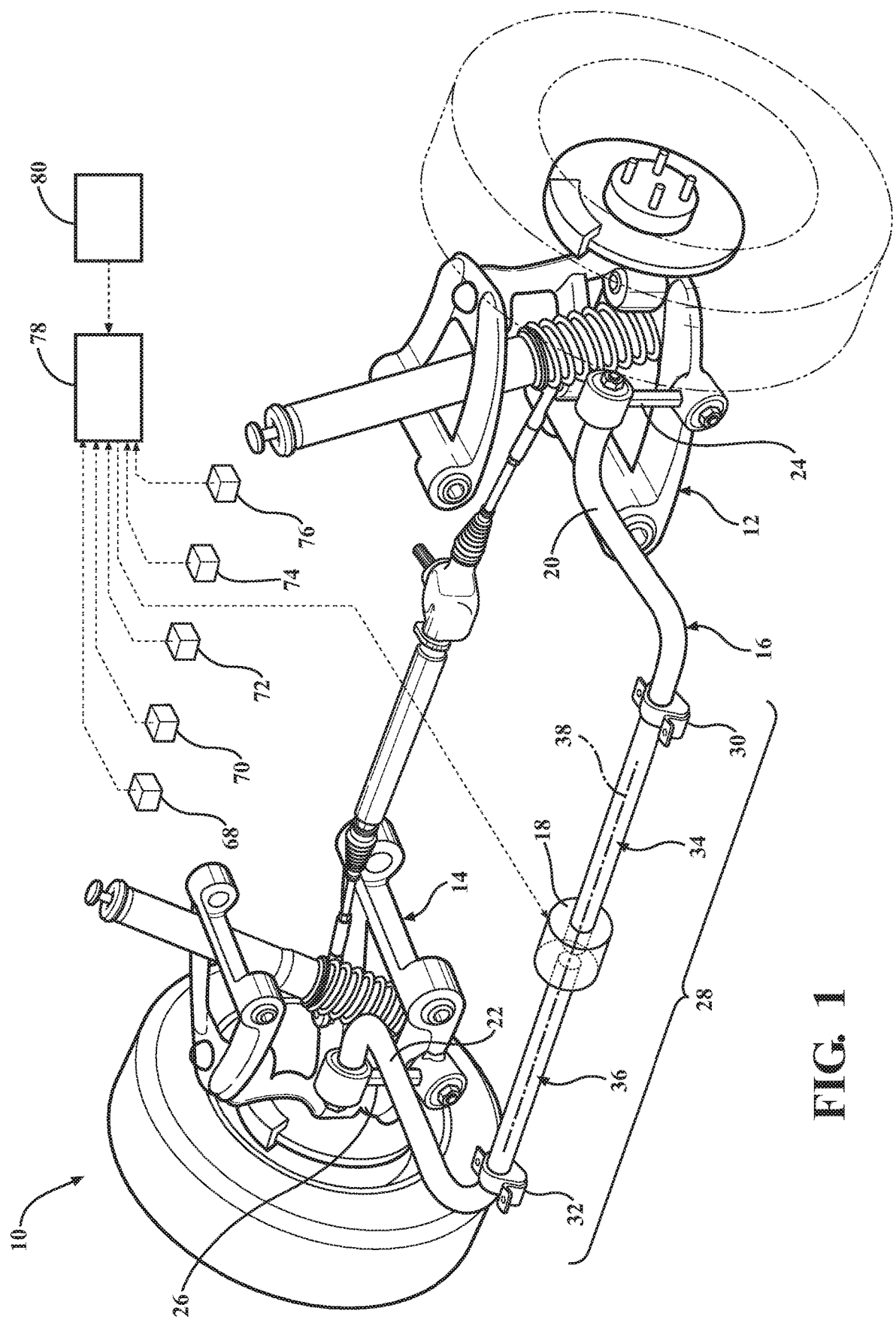
FIG. 1 is a perspective view of a suspension system for a motor vehicle including a sway bar that includes a first torsion bar, a second torsion bar, and a clutch to provide variable torsional stiffness.

Referring to FIG. 1, a suspension system for a motor vehicle is shown and generally indicated by reference number 10. The suspension system 10 includes a left wheel suspension component 12, a right wheel suspension component 14, and a variable stiffness sway bar 16 having a clutch 18 for transmitting torque between the left and right wheel suspension components 12, 14 to provide a plurality of roll stiffnesses. In this embodiment, the left and the right wheel suspension components 12, 14 are control arms for corresponding left and right wheels.

The sway bar 16 includes a first lever arm 20 attached to the left wheel suspension component 12 to receive a force from the same and produce a torque as the left wheel suspension component raises or lowers. The sway bar 16 further includes a second lever arm 22 attached to the right wheel suspension component 14 to receive a force from the same as the right wheel suspension component raises or lowers. In this embodiment, the first and second lever arms 20, 22 are attached to corresponding end links 24, 26 that are in turn attached to left and right control arms. However, it is contemplated that the first and second lever arms can be coupled to other suitable suspension components.

The sway bar 16 includes a torsion spring device 28 in connection between the first and second lever arms 20, 22 and having a variable torsional stiffness for transmitting torque between the first and second lever arms 20, 22. The torsion spring device 28 is pivotally coupled to a vehicle body (not shown) by two or more mounts 30, 32 and includes a first torsion bar 34 and a second torsion bar 36. In this embodiment, the first and second torsion bars 34, 36 form solid steel bars with a common modulus of rigidity and a common outer diameter, such that the first and second torsion bars 34, 36 have a common torsional stiffness. However, it is contemplated that the first and second torsion bars can be hollow tubes or other shapes formed from any suitable material having different torsional stiffnesses.

The first torsion bar 34 is connected to the first lever arm 20. In this embodiment, the first torsion bar 34 and the first lever arm 20 form integral portions of a single-piece bar. However, other embodiments of the first torsion bar and the first lever arm can be formed from any number of separate components coupled together.

The second torsion bar 36 is connected to the second lever arm 22. In this embodiment, the second torsion bar 36 and the second lever arm 22 form integral portions of another single-piece bar. It is contemplated that other embodiments of the second torsion bar and the second lever arm can be formed from any number of separate components coupled together.

Figure 3:
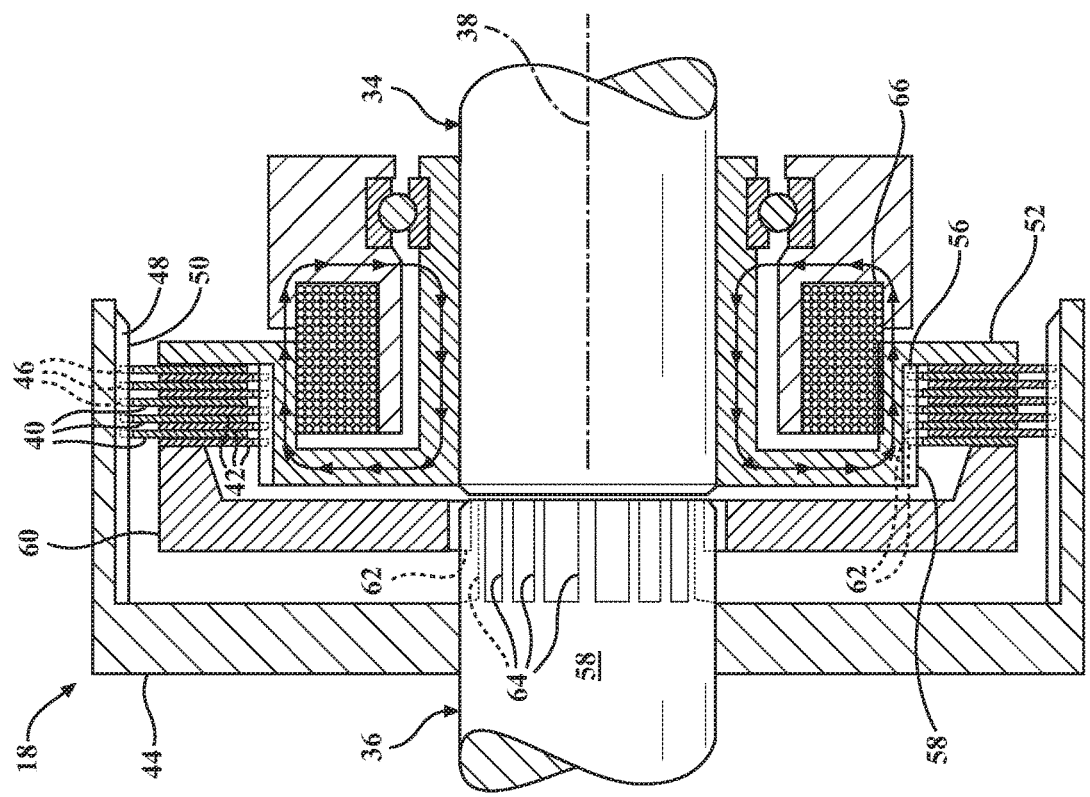
FIG. 3 is an enlarged cross-sectional view of the sway bar of FIG. 1, illustrating the clutch in the engaged position.
Figure 2:
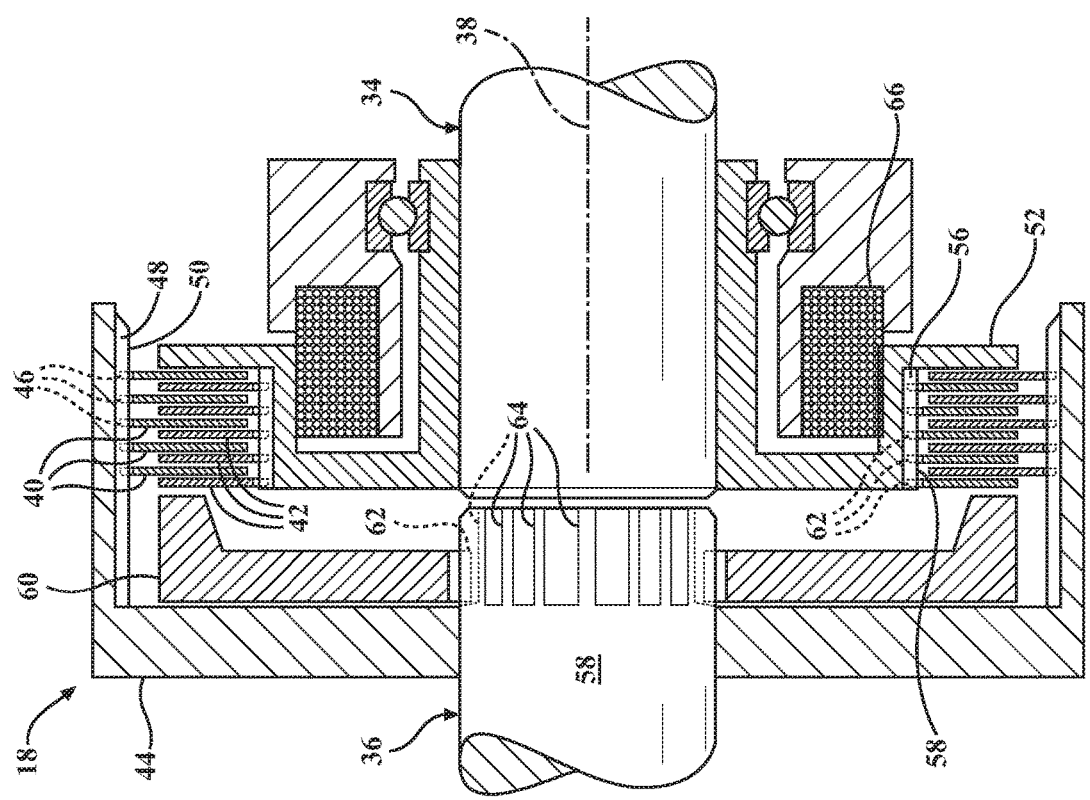
FIG. 2 is an enlarged cross-sectional view of the sway bar of FIG. 1, illustrating the clutch in the disengaged position.
Figure 4:
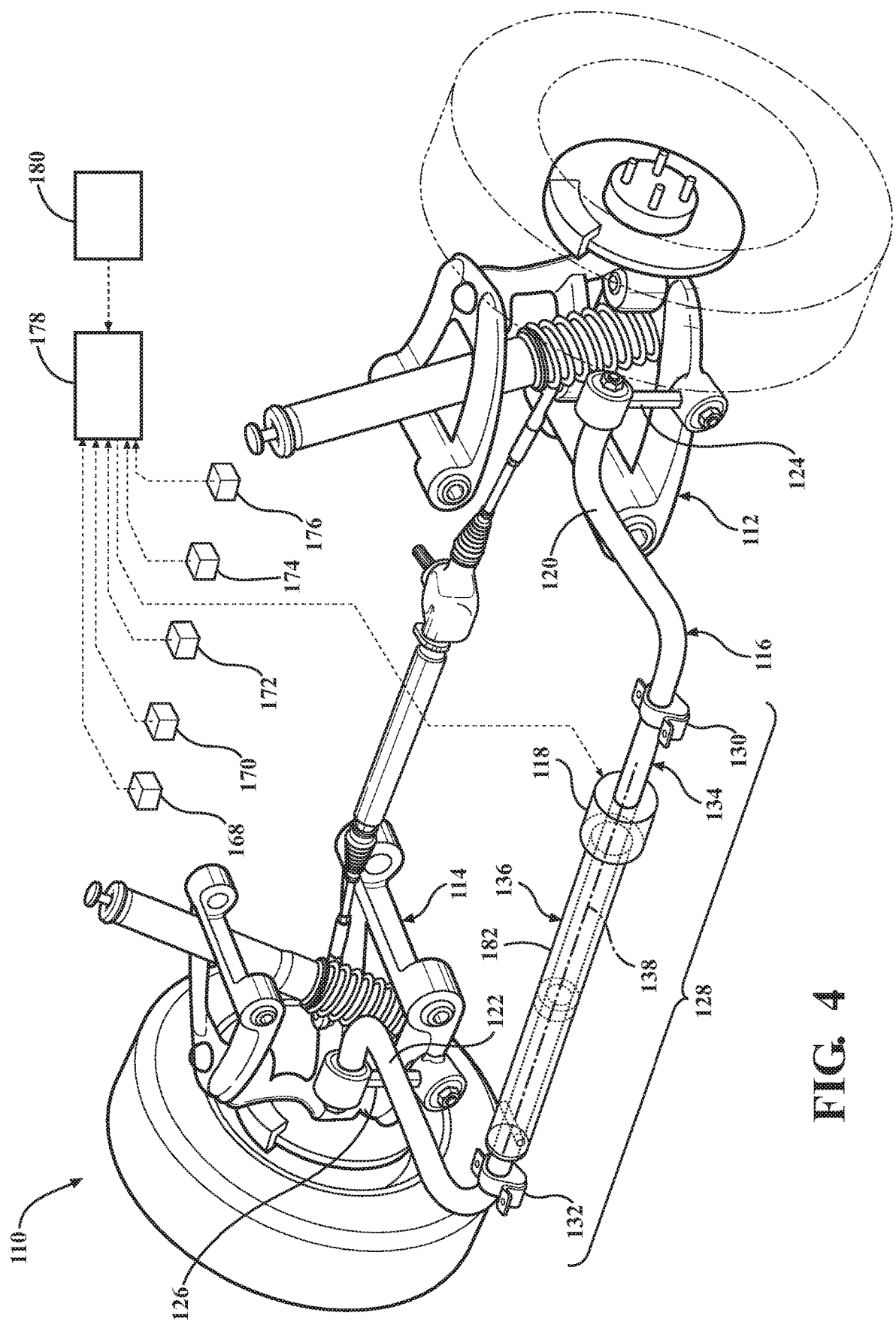
FIG. 4 is a perspective view of another embodiment of a suspension system for a motor vehicle.

Referring to FIGS. 2 and 3, the torsion spring device 28 further includes a clutch 18 connected to the first and second torsion bars 34, 36. The clutch 18 is configured to move between a disengaged position (FIG. 2) and an engaged position (FIG. 3) where the clutch 18 is capable of transmitting torque between the first and second torsion bars 34, 36. The clutch 18 is normally disposed in the disengaged position where at least one of the first and second torsion bars 34, 36 do not transmit torque between the first and second lever arms 20, 22. In this embodiment, neither one of the first and second torsion bars 34, 36 transmits torque between the first and second lever arms 20, 22 in response to the clutch 18 being disposed in the engaged position. More specifically, the first torsion bar 34, the clutch 18, and the second torsion bar 36 are respectively disposed in a serial arrangement along a common axis 38 extending between the first and second lever arms 20, 22, with the clutch 18 disposed between the first and second torsion bars 34, 36. Both of the first and second torsion bars 34, 36 transmit torque between the first and second lever arms 20, 22 in response to the clutch 18 being disposed in the engaged position. In other embodiments, the torsion device may include any number of torsion bars for transmitting torque between the first and second lever arms.

In this embodiment, the clutch 18 is an electromagnetic clutch 18 including a plurality of outer discs 40 connected to one of the first torsion bar 34 and the second torsion bar 36, and a plurality of inner discs 42 connected to the other of the first torsion bar 34 and the second torsion bar 36. The electromagnetic clutch 18 includes a casing 44 coupled to the first torsion bar 34 to receive torque from same, with the outer discs 40 coupled to the casing 44 by a splined connection to receive torque from the casing 44. The outer discs 40 include keys 46 slidable within notches 48 formed in the inner diameter surface 50 of the casing 44 for translating the outer discs 40 along the axis 38. The electromagnetic clutch 18 further includes a rotor 52 coupled to the second torsion bar 36 to receive torque from the same, with the inner discs 42 coupled to the rotor 52 by a splined connection to receive torque from the rotor 52. The inner discs 42 include splines 54 slidable within grooves 56 formed in an outer diameter surface 58 of the rotor 52 for translating the inner discs 42 along the axis 38. The electromagnetic clutch 18 further includes an armature 60 coupled to the first torsion bar 34 by a splined connection to receive torque from the same. The armature 60 include splines 62 slidable within grooves 64 formed in the outer diameter surface of the first torsion bar 34 for translating the armature 60 along the axis 38. The electromagnetic clutch 18 further includes a coil 66 coupled to the rotor 52 and configured to generate a magnetic flux for drawing the armature 60 toward the coil 66 and pressing the outer discs 40 and the inner discs 42 against one another and transmitting torque between the first and second torsion bars 34, 36, when the clutch 18 is disposed in the engaged position. The electromagnetic clutch 18 can further include a plurality of disc separator springs (not shown) configured to space the outer discs 40 from the inner discs 42 when the clutch 18 is disposed in the disengaged position. It is contemplated that the clutch can be any suitable clutch, including but not limited to a manual or hydraulic driven clutch. As one example, the clutch may be a single-plate clutch having a diaphragm spring for holding the clutch in a disengaged position and a hydraulic system for moving the clutch to an engaged position.

Referring back to FIG. 1, the suspension system 10 further includes a plurality of sensors configured to detect one or more conditions that require adjustment to the stiffness of the sway bar 16. The suspension system 10 can include an accelerometer 68 configured to measure acceleration of the motor vehicle. One example of the accelerometer 68 is an inertial measurement unit (IMU) configured to measure at least longitudinal acceleration and lateral acceleration. In addition, the suspension system 10 also includes a vehicle speed sensor 70 configured to measure a speed of the motor vehicle. Examples of the vehicle speed sensor can include a wheel speed sensor and a high-accuracy GPS system. The suspension system 10 can further include a steering sensor 72 configured to measure a steering angle of the motor vehicle. The suspension system can also include a ride height sensor 74 configured to measure a rate of vertical movement of at least one of the left and right wheel suspension components. In one embodiment, both of the ride height sensor and the accelerometer are in the form of the IMU, which is configured to measure vertical acceleration, as well as longitudinal acceleration and lateral acceleration. The suspension system 10 can further include a brake sensor 76 configured to measure brake application. As one example, the brake sensor may be configured to measure the brake fluid pressure in a brake master cylinder. In other embodiments, the brake sensor can be configured to measure brake torque request demand, brake pedal position, or any other suitable parameter corresponding with brake application. It is contemplated that the suspension system can include other suitable sensors, including but not limited to acoustic sensors, lidar, radar, or cameras.

The suspension system 10 further includes a controller 78 configured to adjust the torsional stiffness of the torsion spring device 28 based on measurements of current conditions, including but not limited to current vehicle trajectory, road condition, or traffic. It is contemplated that the controller can be used for an autonomous vehicle and be configured to adjust torsional stiffness of the torsion spring device 28 based on a forecast of future conditions determined by the controller or a separate perception system. The controller 78 sends a first actuation signal to the clutch 18 for moving the clutch 18 to the engaged position. The controller 78 is configured to receive signals from one or more sensors and send the first actuation signal to the clutch 18 in response to the controller 78 determining that the detected conditions meet or exceed a threshold stored in a lookup table. The lookup table can store a threshold for current conditions measured by sensors or future conditions determined by the controller or a separate perception system. In one example, the controller 78 receives a signal from the accelerometer 68, compares the measured acceleration to a predetermined acceleration threshold in a lookup table, and sends the first actuation signal to the clutch 18 in response to the controller determining that the measured acceleration is above the predetermined acceleration threshold. The controller 78 receives signals from the vehicle speed sensor 70 and the steering sensor 72 and compares the measured steering angle to a predetermined steering threshold associated with the measured vehicle speed in the lookup table. The controller 78 sends the first actuation signal to the clutch 18 in response to the controller 78 determining that the measured steering angle is above the predetermined steering threshold. In addition, the controller 78 also receives a signal from the brake sensor 76 and compares the measured brake application and the measured vehicle speed to a predetermined position threshold associated with the measured vehicle speed in the lookup table. The controller 78 sends the first actuation signal to the clutch 18 in response to the controller 78 determining that the measured brake application is above the predetermined brake threshold. Furthermore, the controller 78 receives a signal from the ride height sensor 74 and compares the measured vehicle speed and the measured rate of vertical movement to a predetermined vertical rate threshold associated with the measured vehicle speed in the lookup table. The controller 78 sends a second actuation signal to the clutch 18 to move the clutch 18 to the disengaged position in response to the controller 78 determining that the measured rate of vertical movement is above the predetermined vertical rate threshold. The controller 78 is configured to modulate a current supplied to the electromagnetic clutch 18 for moving the electromagnetic clutch between the disengaged position and the engaged position to provide a plurality of torsional stiffnesses. It is contemplated that the controller can actuate the clutch to move between disengaged and engaged positions in response to determining that these and other measured conditions satisfy any predetermined threshold.

The suspension system 10 can further include a user interface 80 coupled to the controller 78 and configured to send a first command signal to the controller 78 such that the controller 78 sends the first actuation signal to the clutch 18. The user interface 80 may be operated by an operator of the motor vehicle and take the form of a physical button, dial, or a GUI coupled to the controller.

Figure 5:
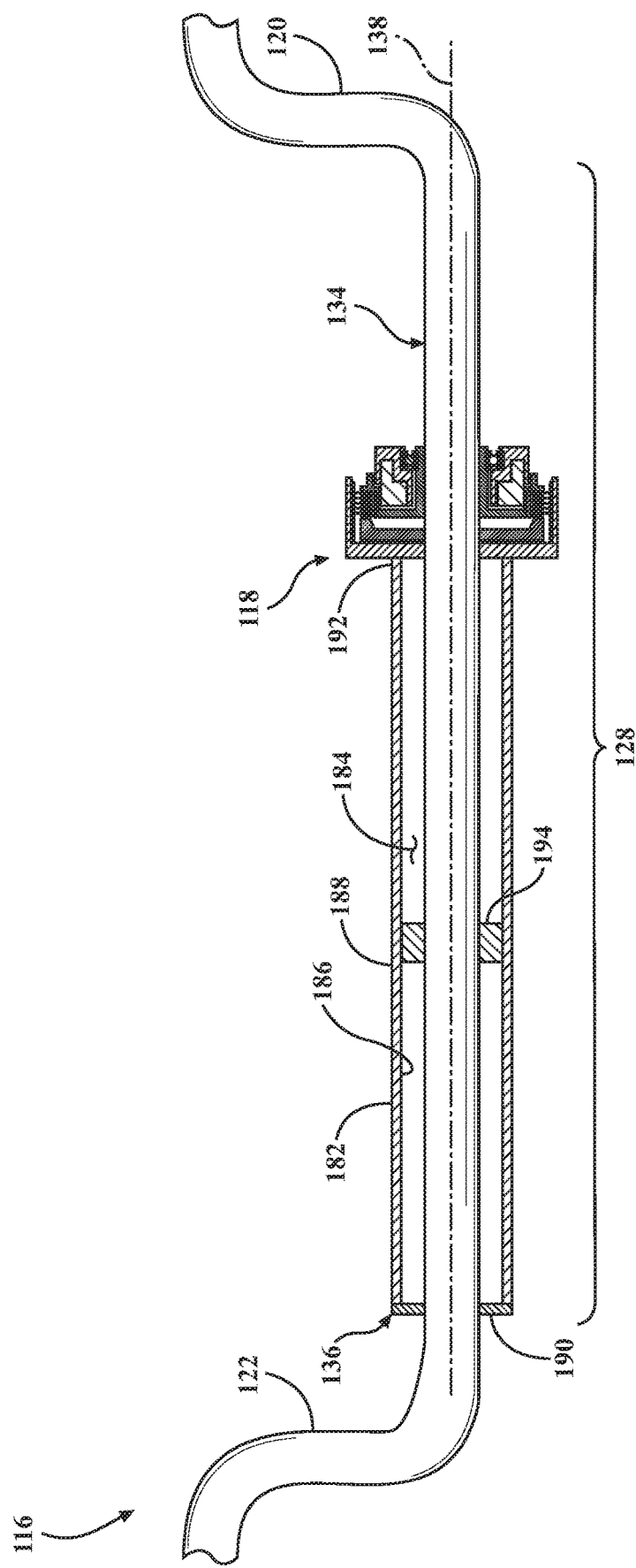
FIG. 5 is a cross-sectional view of the sway bar of FIG. 4, illustrating the sway bar including a clutch, a first torsion bar, and a second torsion bar in the form of a tube with the first torsion bar a least partially disposed within the tube.
Figure 6:
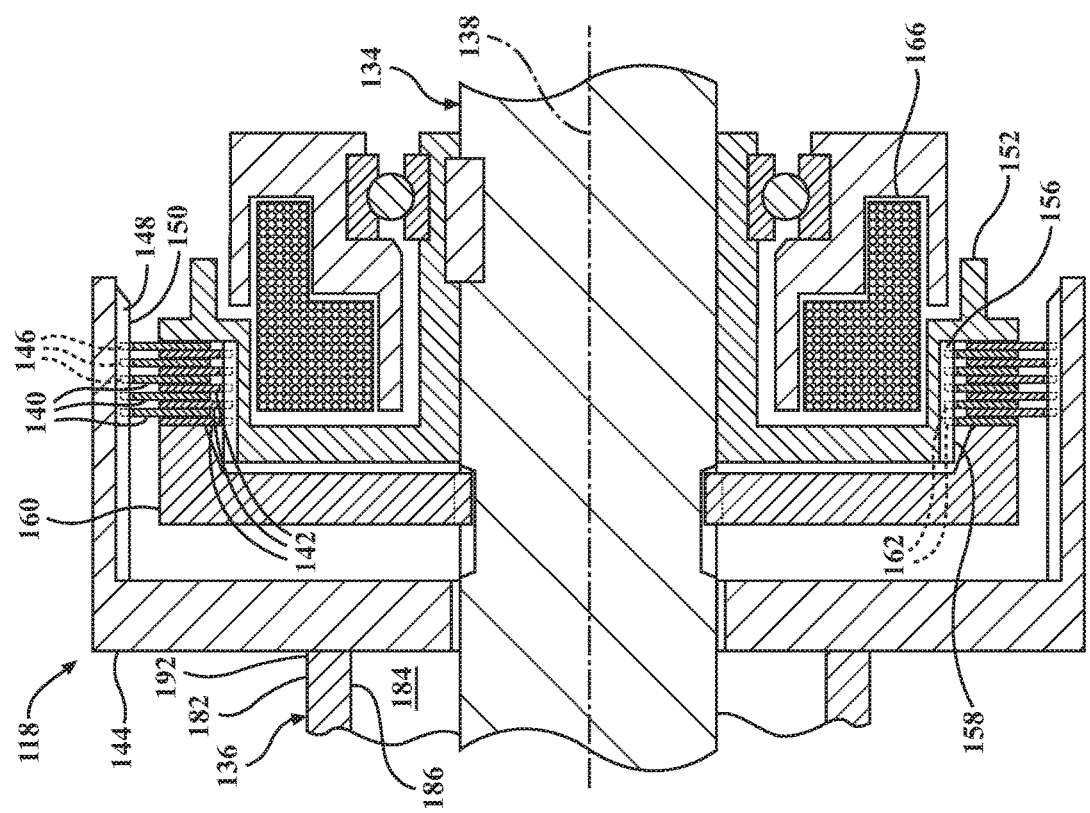
FIG. 6 is an enlarged cross-sectional view of the sway bar of FIG. 5, illustrating the clutch in the disengaged position.
Figure 7:
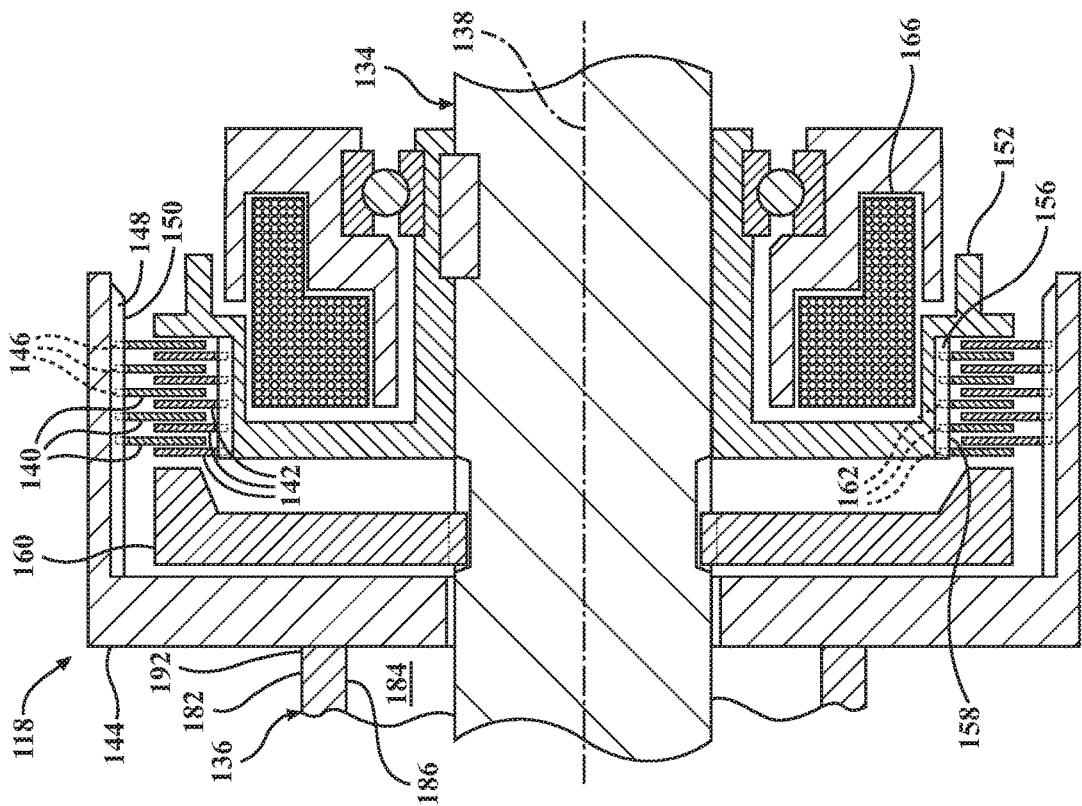
FIG. 7 is an enlarged cross-sectional view of the sway bar of FIG. 5, illustrating the clutch in the engaged position.

Referring to FIGS. 4-7, another embodiment of a suspension system 110 is similar to the suspension system 10 of FIGS. 1-3 and includes the same components identified by the same reference numbers increased by 100. However, while neither one of the first and second torsion bars 34, 36 of FIGS. 1-3 transmit torque between the first and second lever arms 20, 22 in response to the clutch 18 being disposed in the disengaged position (FIG. 2), the first torsion bar 134 of FIGS. 4-7 transmits torque between the first and second lever arms 120, 122 when the clutch 118 is disposed in the disengaged position (FIGS. 5 and 6). The first lever arm 120, the first torsion bar 134, and the second lever arm 122 are integral portions of a solid steel bar having one end attached to the left wheel suspension component 112 and the other end attached to the right wheel suspension component 114. The second torsion bar 136 is coextensive with a portion of the first torsion bar 134 along the common axis 138 that extends between the first and second lever arms 120, 122. Furthermore, in this embodiment, the second torsion bar 136 is a tube 182 defining a bore 184 with at least a portion of the first torsion bar 134 being disposed within the bore 184. The tube 182 has inner and outer diameter surfaces 186, 188 with a continuous wall thickness between those surfaces to avoid creating stress risers and decreasing the torsional stiffness of the tube 182. The tube 182 includes one end 190 welded to the first torsion bar 134 and another end 192 coupled to the clutch 118. The tube 182 reinforces the first torsion bar 134 along its length between the end 190 welded to the first torsion bar 134 and the end 192 coupled to the clutch 118 in response to the clutch 118 being disposed in the engaged position. The torsion spring device 128 further includes a bushing 194 for supporting the first torsion bar within the bore 184 of the tube 182 and facilitating rotational movement of the tube 182 and first torsion bar 134 in response to the clutch 118 being disposed in the disengaged position.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A sway bar for a suspension system of a motor vehicle, the suspension system having a left wheel suspension component and a right wheel suspension component, the sway bar comprising:
   a first lever arm for attachment to the left wheel suspension component;
   a second lever arm for attachment to the right wheel suspension component; and
   a torsion spring device in connection between the first lever arm and the second lever arm, wherein the torsion spring device provides a variable torsional stiffness and comprises:
   a first torsion bar;
   a second torsion bar; and
   a clutch connected to the first torsion bar and the second torsion bar, wherein the clutch is configured to move between a disengaged position and an engaged position where both of the first torsion bar and the second torsion bar transmit torque between the first lever arm and the second lever arm;
   wherein the second torsion bar comprises a tube defining a bore with at least a portion of the first torsion bar being disposed within the bore; and
   wherein the tube includes one end welded to the first torsion bar and another end coupled to the clutch.

2. The sway bar of claim 1 wherein at least one of the first torsion bar and the second torsion bar does not transmit torque between the first lever arm and the second lever arm when the clutch is disposed in the disengaged position.

3. The sway bar of claim 2 wherein the clutch is normally disposed in the disengaged position.

4. The sway bar of claim 3 wherein the clutch comprises an electromagnetic clutch, and the electromagnetic clutch comprises:
   a plurality of outer discs connected to one of the first torsion bar and the second torsion bar;
   a plurality of inner discs connected to the other of the first torsion bar and the second torsion bar; and
   a coil configured to generate a magnetic flux for pressing the outer discs and the inner discs against one another in response to the clutch being disposed in the engaged position.

5. The sway bar of claim 1 wherein the first torsion bar transmits torque between the first lever arm and the second lever arm in response to the clutch being disposed in the disengaged position.

6. The sway bar of claim 5 wherein the first lever arm, the first torsion bar, and the second lever arm are integral portions of a solid bar having one end attached to the left wheel suspension component and the other end attached to the right wheel suspension component.

7. The sway bar of claim 5 wherein the second torsion bar is coextensive with a portion of the first torsion bar along a common axis that extends between the first lever arm and the second lever arm.

8. The sway bar of claim 5 wherein the tube has a continuous wall thickness without any holes formed therethrough.

9. A suspension system for a motor vehicle, the suspension system comprising:
   a left wheel suspension component;
   a right wheel suspension component;
   a sway bar comprising:
   a first lever arm coupled to the left wheel suspension component;
   a second lever arm coupled to the right wheel suspension component; and a torsion spring device in connection between the first lever arm and the second lever arm, wherein the torsion spring device provides a variable torsional stiffness and comprises:
a first torsion bar;
a second torsion bar; and
a clutch connected to the first torsion bar and the second torsion bar, wherein the clutch is configured to move between a disengaged position and an engaged position where both of the first torsion bar and the second torsion bar transmit torque between the first lever arm and the second lever arm; and
a controller configured to send a first actuation signal to the clutch for moving the clutch to the engaged position;
wherein the second torsion bar comprises a tube defining a bore with at least a portion of the first torsion bar being disposed within the bore; and
wherein the tube includes one end welded to the first torsion bar and another end coupled to the clutch.

10. The suspension system of claim 9 wherein the clutch is normally disposed in the disengaged position.

11. The suspension system of claim 9 further wherein the clutch comprises an electromagnetic clutch, and the controller is configured to modulate a current supplied to the clutch for moving the clutch to the engaged position to provide a plurality of torsional stiffnesses.

12. The suspension system of claim 9 further comprising an accelerometer configured to measure acceleration of the motor vehicle, and the controller is configured to send the first actuation signal to the clutch in response to the controller determining that the measured acceleration is above a predetermined acceleration threshold.

13. The suspension system of claim 9 further comprising:
a vehicle speed sensor configured to measure a speed of the motor vehicle; and
a steering sensor configured to measure a steering angle of the motor vehicle, wherein the controller is configured to send the first actuation signal to the clutch in response to the controller determining that the steering angle is above a predetermined steering threshold associated with the speed of the motor vehicle.

14. The suspension system of claim 9 further comprising a ride height sensor configured to measure a rate of vertical movement of at least one of the left wheel suspension component and the right wheel suspension component, and the controller is configured to send the first actuation signal to the clutch in response to the controller determining that the rate of vertical movement is above a predetermined rate threshold.

15. The suspension system of claim 9 further comprising a brake sensor configured to measure a brake application, and the controller is configured to send the first actuation signal to the clutch in response to the controller determining that the brake application is above a predetermined brake threshold.

16. A suspension system for a motor vehicle, the suspension system comprising:
a left wheel suspension component;
a right wheel suspension component;
a sway bar comprising:
a first lever arm for attachment to the left wheel suspension component;
a second lever arm for attachment to the right wheel suspension component; and
a torsion spring device in connection between the first lever arm and the second lever arm, wherein the torsion spring device provides a variable torsional stiffness and comprises:
a first torsion bar;
a second torsion bar; and
a clutch connected to the first torsion bar and the second torsion bar, wherein the clutch is configured to move between a disengaged position and an engaged position where both of the first torsion bar and the second torsion bar transmit torque between the first lever arm and the second lever arm;
a controller configured to send a first actuation signal to the clutch for moving the clutch to the engaged position; and
a user interface coupled to the controller and configured to send a first command signal to the controller such that the controller sends the first actuation signal to the clutch;
wherein the second torsion bar comprises a tube defining a bore with at least a portion of the first torsion bar being disposed within the bore; and
wherein the tube includes one end welded to the first torsion bar and another end coupled to the clutch.

* * * * *